US011076000B2

(12) United States Patent
Ng et al.

(10) Patent No.: US 11,076,000 B2
(45) Date of Patent: *Jul. 27, 2021

(54) METHODS AND SYSTEMS FOR SELECTING A TUNNEL OF AN AGGREGATED CONNECTION

(71) Applicant: Pismo Labs Technology Limited, Hong Kong (HK)

(72) Inventors: Kam Chiu Ng, New Territorries (HK); Patrick Ho Wai Sung, Kowloon (HK); Ying Kwan, New Territorries (HK); Wan Chun Leung, New Territorries (HK)

(73) Assignee: Pismo Labs Technology Limited, Hong Kong (HK)

( * ) Notice: Subject to any disclaimer, the term of this patent is extended or adjusted under 35 U.S.C. 154(b) by 0 days.

This patent is subject to a terminal disclaimer.

(21) Appl. No.: 16/673,631

(22) Filed: Nov. 4, 2019

(65) Prior Publication Data
US 2020/0068027 A1 Feb. 27, 2020

Related U.S. Application Data

(63) Continuation of application No. 15/728,112, filed on Oct. 9, 2017, now Pat. No. 10,469,597, which is a
(Continued)

(51) Int. Cl.
*G06F 15/16* (2006.01)
*H04L 29/08* (2006.01)
(Continued)

(52) U.S. Cl.
CPC ........ *H04L 67/142* (2013.01); *H04L 12/4625* (2013.01); *H04L 12/4633* (2013.01);
(Continued)

(58) Field of Classification Search
CPC ............. H04L 12/4625; H04L 12/4633; H04L 45/7453; H04L 61/2007; H04L 61/6022; H04L 67/142
(Continued)

(56) References Cited

U.S. PATENT DOCUMENTS 6,765,866 B1 * 7/2004 Wyatt ................... H04L 49/256
370/229
6,977,932 B1 * 12/2005 Hauck .................... H04L 45/50
370/392
(Continued)

*Primary Examiner* — Moustafa M Meky
*Assistant Examiner* — Thorne E Waugh
(74) *Attorney, Agent, or Firm* — Fisherbroyles, LLP

(57) ABSTRACT

The present invention discloses methods and systems for transmitting a received packet at a first network node through an aggregated connection. The first network node determines session information of the received packet and determines whether a new tunnel needs to be selected for transmitting the received packet. When a new tunnel needs to be selected, a hash result is determined. The hash result is substantially based on the session information and the number of available tunnels. A first tunnel is determined for transmitting the received packet according to the hash result. The session information and tunnel ID of the first tunnel is then stored in a first database. The received packet is transmitted through the first tunnel. When a new tunnel need not be selected, a lookup is performed to determine a tunnel ID substantially based on the session information. The received packet is transmitted through the determined tunnel.

20 Claims, 7 Drawing Sheets

Related U.S. Application Data continuation of application No. 14/410,101, filed as application No. PCT/IB2014/064141 on Aug. 29, 2014, now Pat. No. 9,787,776.

(51) Int. Cl.
*H04L 12/46* (2006.01)
*H04L 12/743* (2013.01)
*H04L 29/12* (2006.01)

(52) U.S. Cl.
CPC ...... *H04L 45/7453* (2013.01); *H04L 61/2007* (2013.01); *H04L 61/6022* (2013.01)

(58) Field of Classification Search
USPC ......................................................... 709/223
See application file for complete search history.

(56) References Cited

U.S. PATENT DOCUMENTS

| | | | | |
|---|---|---|---|---|
| 7,352,760 B2 * | 4/2008 | Wyatt | .................... | H04L 49/256 370/409 |
| 7,388,877 B2 * | 6/2008 | Ota | ..................... | H04L 12/4633 370/397 |
| 7,633,921 B2 * | 12/2009 | Thubert | .................. | H04L 12/66 370/310 |
| 7,649,890 B2 * | 1/2010 | Mizutani | .............. | H04L 47/825 370/395.21 |
| 7,873,060 B2 * | 1/2011 | Luo | ..................... | H04L 12/4633 370/401 |
| 7,885,248 B2 * | 2/2011 | Harper | .................. | H04L 67/148 370/349 |
| 8,019,346 B2 * | 9/2011 | Sachs | ................ | H04W 36/0011 455/439 |
| 8,776,209 B1 * | 7/2014 | Kumar | ................ | H04L 63/0272 726/12 |
| 9,385,994 B2 * | 7/2016 | Ke | ................... | H04L 63/0272 |
| 9,787,776 B2 * | 10/2017 | Ng | .................... | H04L 67/142 |
| 10,469,597 B2 * | 11/2019 | Ng | .................... | H04L 45/7453 |
| 2013/0283037 A1 * | 10/2013 | Katz | ...................... | H04L 63/04 713/151 |
| 2015/0036513 A1 * | 2/2015 | Bukin | .................... | H04L 43/04 370/250 |
| 2015/0124826 A1 * | 5/2015 | Edsall | .................... | H04L 45/66 370/392 |
| 2015/0281089 A1 * | 10/2015 | Marchetti | ............. | H04L 47/125 370/235 |
| 2015/0295855 A1 * | 10/2015 | Karthikeyan | ....... | H04L 43/0876 370/232 |

* cited by examiner

METHODS AND SYSTEMS FOR SELECTING A TUNNEL OF AN AGGREGATED CONNECTION

RELATED APPLICATIONS

The present application is a continuation of U.S. patent application Ser. No. 15/728,112, filed Oct. 9, 2017, which issued as a United States Patent on Nov. 5, 2019, titled "METHODS AND SYSTEMS FOR SELECTING A TUNNEL OF TRANSMITTING PACKETS THROUGH AN AGGREGATED CONNECTION", which is a continuation of U.S. patent application Ser. No. 14/410,101, filed Dec. 21, 2014, issued as U.S. Pat. No. 9,787,776 on Oct. 10, 2017, titled "METHODS AND SYSTEMS FOR TRANSMITTING PACKETS THROUGH AN AGGREGATED CONNECTION", which is the U.S. national phase of International Application No. PCT/IB2014/064141, filed Aug. 29, 2014, titled "METHODS AND SYSTEMS FOR TRANSMITTING PACKETS THROUGH AN AGGREGATED CONNECTION", each of which is hereby incorporated by reference.

TECHNICAL FIELD

The present invention relates in general to the field of computer networks. More particularly, the present invention relates to methods and systems for transmitting a received packet at a first network node through a tunnel of an aggregated connection comprising a plurality of tunnels. The tunnel may be selected according to session information of the received packet.

BACKGROUND ART

A multi Wide Area Network (WAN) Site-to-Site VPN router is a router that supports aggregating the bandwidth of multiple interconnections, e.g., WAN connections or tunnels for accessing one or more remote private networks. In some implementations, when there are multiple tunnels available in an aggregated connection, packets of each session may be routed to the multiple tunnels in order to utilize the bandwidth of the multiple tunnels. For example, in a session based site-to-site virtual private network (VPN) connection VPN traffic is routed to multiple WAN connections between two sites (e.g., sites A and B).

In some scenarios, when packets of the same session are transmitted through different tunnels of an aggregated connection, it may be possible that the performance experienced by the packets is not satisfactory. This may happen due to interference. This is more likely to happen when the signal quality is not good, for example, in wireless communications in public areas. Therefore, a solution is required for making packets belonging to a particular session to be transmitted through the same tunnel, even when other tunnels are available. Another benefit of using only one tunnel to transmit packets of a particular session is that it allows all packets of the particular session to experience similar performance.

DISCLOSURE OF THE INVENTION

Summary of Invention

The present invention discloses methods and systems for transmitting a received packet at a first network node through an aggregated connection. The aggregated connection comprises a plurality of tunnels which are established between the first network node and a second network node. The first network node determines session information of the received packet and determines whether a new tunnel needs to be selected for transmitting the received packet. When a new tunnel needs to be selected, a hash result is determined. The hash result is substantially based on the session information and the number of available tunnels. A first tunnel is determined for transmitting the received packet according to the hash result. The session information and corresponding tunnel ID of the first tunnel is then stored in a first database, and the received packet is transmitted through the first tunnel. Alternatively, when a new tunnel does not need to be selected, a lookup is performed in order to determine a tunnel ID substantially based on the session information. A tunnel is then determined for transmitting the received packet based on the tunnel ID, and the received packet is transmitted through the determined tunnel.

According to one of the embodiments, the session information is based, at least in part, on one or more of a source IP address, a destination IP address, a source MAC address, a destination MAC address, a VLAN tag, a source port number, and a destination port number.

According to one of the embodiments, a new tunnel is selected when the received packet is a first of a session, i.e., the received packet is received earliest among other packets of the session. According to one of the embodiments, a new tunnel is selected when a second tunnel, that has been used to transmit one or more sessions, is dropped, broken, or terminated. When the second tunnel is dropped, broken, or terminated, one or more new tunnels may be selected for the one or more sessions respectively. A new tunnel may also be selected when performance of a third tunnel deteriorates, where the third tunnel has been used to transmit one or more sessions.

According to one of the embodiments, the available tunnels are assigned with weights. The weights are assigned according to a policy, and the policy is based on one or more of the following criteria: performance of the tunnels, service provider, usage limit, location, time, usage price, security, user identity, Internet Protocol address range, communication protocol, communication technology, application, and device.

According to one of the embodiments, the first network node sends the session information and the corresponding tunnel ID of the first tunnel to the second network node. The second network node stores the session information and corresponding tunnel ID of the first tunnel in a second database. The second network node then transmits packets with the session information to the first network node through the first tunnel.

Details of Invention

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Embodiments, or portions thereof, may be embodied in program instructions operable upon a processing unit for performing functions and operations as described herein. The program instructions making up the various embodiments may be stored in a storage medium.

The program instructions making up the various embodiments may be stored in a storage medium. Moreover, as disclosed herein, the term "storage medium" may represent one or more devices for storing data, including read only memory (ROM), programmable read-only memory (PROM), erasable programmable read-only memory (EPROM), random access memory (RAM), magnetic RAM, core memory, floppy disk, flexible disk, hard disk, magnetic tape, CD-ROM, flash memory devices, a memory card and/or other machine readable mediums for storing information. The term "machine-readable medium" includes, but is not limited to portable or fixed storage devices, optical storage mediums, magnetic mediums, memory chips or cartridges, wireless channels and various other mediums capable of storing, containing or carrying instruction(s) and/or data. A machine-readable medium can be realized by virtualization, and can be a virtual machine readable medium including a virtual machine readable medium in a cloud-based instance.

The term computer-readable medium, main memory, or secondary storage, as used herein refers to any medium that participates in providing instructions to a processing unit for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks. Volatile media includes dynamic memory. Transmission media includes coaxial cables, copper wire and fiber optics. Transmission media can also take the form of acoustic or light waves, such as those generated during radio-wave and infra-red data communications.

A volatile storage may be used for storing temporary variables or other intermediate information during execution of instructions by a processing unit. A non-volatile storage or static storage may be used for storing static information and instructions for processor, as well as various system configuration parameters.

The storage medium may include a number of software modules that may be implemented as software code to be executed by the processing unit using any suitable computer instruction type. The software code may be stored as a series of instructions or commands, or as a program in the storage medium.

Various forms of computer readable media may be involved in carrying one or more sequences of one or more instructions to the processor for execution. For example, the instructions may initially be carried on a magnetic disk from a remote computer. Alternatively, a remote computer can load the instructions into its dynamic memory and send the instructions to the system that runs the one or more sequences of one or more instructions.

A processing unit may be a microprocessor, a microcontroller, a digital signal processor (DSP), any combination of those devices, or any other circuitry configured to process information.

A processing unit executes program instructions or code segments for implementing embodiments of the present invention. Furthermore, embodiments may be implemented by hardware, software, firmware, middleware, microcode, hardware description languages, or any combination thereof. When implemented in software, firmware, middleware or microcode, the program instructions to perform the necessary tasks may be stored in a computer readable storage medium. A processing unit(s) can be realized by virtualization, and can be a virtual processing unit(s) including a virtual processing unit in a cloud-based instance.

Embodiments of the present invention are related to the use of a computer system for implementing the techniques described herein. In an embodiment, the inventive processing units may reside on a machine such as a computer platform. According to one embodiment of the invention, the techniques described herein are performed by computer system in response to the processing unit executing one or more sequences of one or more instructions contained in the volatile memory. Such instructions may be read into the volatile memory from another computer-readable medium. Execution of the sequences of instructions contained in the volatile memory causes the processing unit to perform the process steps described herein. In alternative embodiments, hardwired circuitry may be used in place of or in combination with software instructions to implement the invention. Thus, embodiments of the invention are not limited to any specific combination of hardware circuitry and software.

A code segment, such as program instructions, may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Alternatively, hardwired circuitry may be used in place of, or in combination with, software instructions to implement processes consistent with the principles of the invention. Thus, implementations consistent with principles of the invention are not limited to any specific combination of hardware circuitry and software.

A network interface that may be provided by a node is an Ethernet interface, a frame relay interface, a fibre optic interface, a cable interface, a DSL interface, a token ring interface, a serial bus interface, a universal serial bus (USB) interface, Firewire interface, Peripheral Component Interconnect (PCI) interface, etc.

A network interface may be implemented by a standalone electronic component or may be integrated with other electronic components. A network interface may have no network connection or at least one network connection depending on the configuration. A network interface may be an Ethernet interface, a frame relay interface, a fibre optic interface, a cable interface, a Digital Subscriber Line (DSL) interface, a token ring interface, a serial bus interface, a universal serial bus (USB) interface, Firewire interface, Peripheral Component Interconnect (PCI) interface, cellular network interface, etc.

A network interface may connect to a wired or wireless access network. An access network may carry one or more network protocol data. A wired access network may be implemented using Ethernet, fiber optic, cable, DSL, frame relay, token ring, serial bus, USB, Firewire, PCI, or any material that can pass information. A wireless access network may be implemented using infra-red, High-Speed Packet Access (HSPA), HSPA+, Long Term Evolution (LTE), WiMax, General packet radio service (GPRS), Global System for Mobile Communications (GSM), Enhanced Data rates for GSM Evolution (EDGE), Code division multiple access (CDMA), WiFi, CDMA2000, Wideband CDMA (WCDMA), Time Division CDMA (TD-SCDMA), BLUETOOTH, WiBRO, Evolution-Data Optimized (EV-DO); Digital Enhanced Cordless Telecommunications (DECT); Digital AMPS (IS-136/TDMA); Integrated Digital Enhanced (iDEN) or any other wireless technologies. For example, a network interface may be used as a local area network (LAN) interface or a wide area network (WAN) interface.

Embodiments, or portions thereof, may be embodied in a computer data signal, which may be in any suitable form for communication over a transmission medium such that it is readable for execution by a functional device (e.g., processing unit) for performing the operations described herein. The computer data signal may include any binary digital electronic signal that can propagate over a transmission medium such as electronic network channels, optical fibers, air, electromagnetic media, radio frequency (RF) links, and the like, and thus the data signal may be in the form of an electrical signal, optical signal, radio frequency or other wireless communication signal, etc. The code segments may, in certain embodiments, be downloaded via computer networks such as the Internet, an intranet, LAN, metropolitan area network (MAN), wide area network (WAN), the public switched telephone network (PSTN), a satellite communication system, a cable transmission system, and/or the like.

FIG. 1A illustrates system 100, which is a network environment according to various embodiments of the present invention. A plurality of tunnels may be established between network nodes 106 and 108 through interconnected networks 110. The plurality of tunnels may be combined or aggregated to form an aggregated connection. Host 111 and laptop 112 may be connected to network node 106 through one or more of the network interfaces of network node 106. Host 111 and laptop 112 may be located in a local area network (LAN) of network node 106. Similarly, host 121 and server 122 may be connected to network node 108 through one or more network interfaces of network node 108. Host 121 and server 112 may be located in a LAN of network node 108. Network node 106 may connect to interconnected networks 110 through one or more wide area network (WAN) interfaces of network node 106 and network node 108 may connect to interconnected networks 110 through one or more WAN interfaces of network node 108.

A plurality of tunnels may be aggregated, combined or bonded together to form one aggregated connection. Those skilled in the arts would appreciate that there are myriad ways to aggregate, combine, or bond a plurality of tunnels to form one aggregated connection. An aggregated connection is perceived as one connection by sessions or applications that are using it. An aggregated connection can be perceived as a tunnel, a virtual private network or connection or connectionless oriented connection. For example, an aggregated connection is a Transmission Control Protocol (TCP) connection. In another example, an aggregated connection is a User Datagram Protocol (UDP) connection. In another example, an aggregated connection is an aggregation of a plurality of tunnels, and each tunnel is established between network nodes 106 and 108. In another example, an aggregated end-to-end connection is a VPN tunnel, comprising a plurality of tunnels, and each tunnel is established between network nodes 106 and 108.

FIG. 1B illustrates system 100 adapted according to embodiments showing tunnels between network nodes 106 and 108. When establishing a bonded connection between sites 102 and 104, such as by implementing a bonded site-to-site VPN connection, M×N virtual tunnels 116 may be created. Site 102 and network node 106 may comprise M connections 112, and site 104 and network node 108 may comprise N connections 114. Connections 112 and 114 are access connections for communicating information within interconnected network 110 between sites 102 and 104. In the illustrated embodiment, M is equal to 3 and N is equal to 2; however, these values may vary according to desired devices and configurations. Connections 112 and 114 may have similar or differing bandwidth capabilities. Further, connections 112 and 114 may comprise different types of WAN connections, such as a WiFi, cable, DSL, T1, 3G, 4G, LTE, satellite connections, and the like. It is also noted that site 102 and site 104 may be thought of as both a sender and receiver, and discussions regarding the functionality of either site may be implemented on the other site. In other words, system 100 may be implemented as a symmetrical network. Virtual tunnels 116 correspond to a unique permutation of the network connections of site 102 and the network connections of site 104. An aggregated connection is formed between network nodes 106 and 108. Connections 112 and 114 are embodied as logical connections.

Host 111 and laptop 112 may be located in site 102, and host 121 and server 122 may be located in site 104.

A host, such as host 111 and host 121, can be a computing device, a laptop computer, a mobile phone, a smart-phone, a desktop computer, a personal digital assistant, or any other electronic device that is capable of connecting to a network node and to interconnected networks.

Server 122 may be a database server, file server, mail server, print server, web server, gaming server, application server or the like. Server 122 is a computing device which may be connected to one or more clients through interconnected networks 110 or any other network and through network node 108. Server 121 can also be a virtualized server.

FIG. 2 is an illustrative block diagram of a network node, such as network node 106, according to one of the embodiments of the present invention. Network node 106 comprises processing unit 201, main memory 202, system bus 203, secondary storage 204, and plurality of network interfaces 205. Processing unit 201 and main memory 202 are connected to each other directly. System bus 203 connects processing unit 201 directly or indirectly to secondary storage 204, and plurality of network interfaces 205. Using system bus 203 allows network node 106 to have increased modularity. System bus 203 couples processing unit 201 to secondary storage 204, and plurality of network interfaces 205. System bus 203 can be any of several types of bus structures including a memory bus, a peripheral bus, and a local bus using any of a variety of bus architectures. Secondary storage 204 stores program instructions for execution by processing unit 201.

Network node 108 may have substantially the same block diagram as that of network node 106 as illustrated in FIG. 2.

Network nodes 106 and 108 may work as a gateway, a router, a switch, an access point, a hub, a bridge, etc.

FIG. 3 is a flowchart illustrating a process according to one of the embodiments of the present invention. The process of FIG. 3 may be performed at network node 106. When network node 106 receives a packet from host 111 or laptop 112 in step 301, processing unit 201 of network node 106 determines session information of the packet in step 302. Details regarding session information are discussed later. In step 303, a first tunnel is selected for transmitting the packet based on the session information of the packet. Network node 106 then transmits the packet to network node 108 through the first tunnel in step 304.

Packets of the same session are preferred to be transmitted through the same tunnel for various reasons.

One of the reasons is that when packets belonging to a session are transmitted through the same tunnel, the packets are likely to experience similar network performance, such as latencies, bandwidth, etc. Therefore the packets are likely to arrive at network node 108 in sequence. It would be known to those skilled in the art that for certain protocols, such as TCP, when one or more packets are missing, the receiving end may assume that the one or more packets are dropped. It may be possible that packets that are later in sequence than the one or more missing packets have already arrived at the receiving end. Since the transmitting end does not receive any acknowledgement corresponding to the one or more missing packets, it may start transmitting the one or more missing packets again, and may also again transmit the packets that are later in sequence. This may be a waste of resources, as the packets that are later in sequence are received twice. In order to avoid this, packets of the same session are transmitted through the same tunnel.

Another reason is that using two or more tunnels simultaneously for a particular session, the performance experienced while transmitting packets belonging to the particular session may not be satisfactory due to interference. This is especially true when the signal quality is not good, for example, in wireless communications in public areas. It is possible that when packets belonging to a particular session are transmitted through the same tunnel, i.e., using only one tunnel at a given time, the performance experienced while transmitting packets may be better. For this reason, it may be desirable to assign a tunnel to a session, so that packets belonging to the session are only transmitted through the selected tunnel.

In one example, the session information may be determined by inspecting the header of the packet. Header of the packet may be used to determine the session information based on source address, the destination address, protocol, port number, and etc. The determination may also be performed using deep packet inspection techniques to inspect payload of the packet. For example, for determining session information of Hypertext Transfer Protocol (HTTP) sessions, payload of the packets may be inspected by checking the uniform resource locator (URL) in the HTTP information of the packets or by inspecting the data in the payload of the packets.

It is possible that a packet may not belong to any session. For example, the packet does not belong to any session if the packet is an Address Resolution Protocol (ARP) packet or Internet Control Message Protocol (ICMP) packet. When the packet does not belong to any session, a tunnel may be selected at random for transmitting the packet. Alternatively, a particular tunnel may be predefined by the user or administrator for transmitting packets that do not belong to any session. A UDP packet may or may not belong to a session. Those who are skilled in the art would appreciate that there are myriad ways to determine a session that an UDP packet belongs to by inspecting the source address, destination address and/or port number. Those who are skilled in the art would also appreciate that contents in the payload of an UDP packet can be used to determine a session that the UDP packet belongs to. There is no restriction that a session is identified only by information in the header of the packet and/or in the header of TCP/UDP. DPI techniques may be employed to determine the session.

In one variant, for example, the session information is determined using the source IP address of the packet. The source IP address may be converted into an integer value, which may be the session information, and then is used to determine a first tunnel through which the packet should be transmitted. Therefore, it is possible that packets with the same source IP address may be transmitted through the same tunnel, even if they belong to different sessions. However, packets belonging to a particular session may always be transmitted through the same tunnel since their source IP addresses are likely to be the same. For example, laptop 112 establishes a file transfer protocol (FTP) session with server 122. When packets belonging to the FTP session arrive at network node 106 from laptop 112, the source IP address is identified as the IP address of laptop 112, and according to this session information, a first tunnel may be selected for the FTP session. Laptop 112 may establish a video conferencing session with host 121, and when packets belonging to the video conferencing session arrive at network node 106 from laptop 112, the source IP address is identified as the IP address of laptop 112. A tunnel selected for transmitting the packets belonging to the video conferencing based on the session information may or may not be same as the tunnel selected for transmitting the packets belonging to the FTP session, even though the session information, i.e., the source IP address, is the same. This is because the result of determination in step 303 may be different when the process of FIG. 3 is performed at different times, as a selection process is applied to the session information before selecting a tunnel.

In another variant, the session information is determined using source IP address and destination IP address of the packet. A combination of the source IP address and the destination IP address may be converted into an integer value, which may be the session information. The session information is then used to determine a first tunnel through which the packet should be transmitted. Packets with the same source IP address and same destination IP address may be transmitted through the same tunnel.

In another variant, port numbers of the packets are also taken into consideration when determining the session information. When packets have the same port number, it may be an indication that the packets belong to the same application. A combination of the source IP address, destination IP address, destination port number and/or source port number may be converted into an integer value, which may be the session information.

In some scenarios, when the packet is not an IP packet, and is a layer two packet, the session information may be determined using source MAC address and/or the destination MAC address. For packets or frames transmitted by virtual LAN(s), the session information may be determined using VLAN Tag of an Ethernet frame, which may encapsulate a packet, such as an IP packet. For example, when host 111 transmits an Ethernet frame to network node 106 from one of its VLANs, the session information may be determined using the VLAN tag of the Ethernet frame. The session information may also be based on a combination of the VLAN tag and the MAC address of the host. In another example, when the Ethernet frame encapsulates an IP packet, the session information may be based on the source IP address (IP address of the host specified in the IP packet), the VLAN tag, the MAC address, or a combination of two or more of them. Similarly the session information may also be based on one or more of destination IP address, destination MAC address, VLAN tag of destination, or a combination of two or more of them.

According to one of the embodiments of the present invention, network node 106 transmits a packet to network node 108 in step 304 by encapsulating the packet in an encapsulating packet. The encapsulating packet is then transmitted to network node 108. When the encapsulating packet arrives at network node 108, network node 108 may decapsulate the encapsulating packet in order to retrieve the packet. The packet is then sent to the destination of the packet by network node 108.

One of the purposes for encapsulating the packets inside encapsulating packets is to reorder the packets when the encapsulating packets are received at the other end of the aggregated connection, as the encapsulating packets may arrive out of order. The data packets may also be of varying protocols, and may be encapsulated inside encapsulating packets in order to fulfil protocol requirements of the aggregated connection.

FIG. 4 is a flowchart illustrating a process according to one of the embodiments of the present invention. Steps 403-407 are the detailed steps involved in performing step 303 of FIG. 3. After determining session information in step 302, processing unit 201 determines in step 403 whether any other packet belonging to the same session has been received before, i.e. whether the packet is a first of the session, and whether the packet is received earliest among other packets of the session. If the packet is the first packet of the session, processing unit 201 performs a selection process by applying a hashing process to the session information in step 404, and generates a hash result. In step 405, processing unit 201 selects a new tunnel, such as a first tunnel for transmitting the packet, and other packets of the session. The new tunnel is selected substantially based on the hash result. The session information and tunnel ID of the new tunnel is then stored in a first database in step 406. The packet is transmitted through the first tunnel in step 304.

Alternatively, if the packet is not the first packet of the session, processing unit 201 performs a lookup on a first database in step 407 in order to determine a tunnel ID corresponding to the session information. Processing unit 201 then selects a first tunnel for transmitting the packet according to the tunnel ID in step 408. The packet is then transmitted through the first tunnel in step 304.

Processing unit 201 may be required to select a new tunnel in two scenarios. One of the scenarios, as discussed in FIG. 4, is when a received packet is a first of a session. Another scenario is when a tunnel that was being used to transmit one or more sessions is dropped, broken or terminated, such that new tunnel(s) are selected for transmitting the one or more sessions. The new tunnel is selected from available tunnels.

The availability of tunnels may be determined according to various parameters, such as bandwidth limit, usage price, latency, packet drop rate, etc. For example, if a bandwidth limit of a tunnel is approaching, the tunnel may no longer be considered as an available tunnel so that the tunnel is not selected for any more new sessions. It may be known to those skilled in the art that when a bandwidth limit of a tunnel is approaching, more and more packets are likely to be dropped. Therefore, in order to limit the number of packets transmitted through the tunnel, the tunnel may be considered as not available for new sessions. The tunnel may still be used to carry packets of sessions that the tunnels were previously being used for.

In one variant, instead of assigning weights to the tunnels, the user or administrator may define a maximum number of sessions that each tunnel may be used to transmit. For example, when the number of sessions is defined as ten for the first tunnel, the first tunnel may be selected for up to ten sessions, i.e., the first tunnel may be used to transmit up to ten sessions. As long as the first tunnel is being used to transmit less than ten sessions, the first tunnel may be considered to be an available tunnel. If the tunnel starts being used for transmitting ten or more sessions, the first tunnel may no longer be considered to be an available tunnel for further selection for new sessions.

The number of available tunnels may change from time to time. This is the reason why a hash result for the same session information may be different at different times. When a packet is not a first packet of the session, the benefit of performing a lookup on a database to select a tunnel for transmitting the packet, instead of performing the hashing process is that all packets of the session are then likely to be transmitted through the same tunnel. If the hashing process is performed for every packet of the session, it is possible that another tunnel is selected for packets of the same session because the number of available tunnels may be changed.

There is no limitation that hashing process method is the only method to select an available tunnel based on session information. According to one of the embodiments, an arbitrary number is assigned to each session according to the session information. The arbitrary number may or may not be unique for each session. For example, processing unit 201 may be configured to assign an arbitrary number in the range of 0 to 9 to each session, and the arbitrary number is assigned randomly. The arbitrary number may also correspond to a tunnel. For example, if an arbitrary number assigned to a session is 0, 1 or 2, the session is transmitted through a first tunnel. If an arbitrary number assigned to a session is 3, 4, 5, or 6, the session is transmitted through a second tunnel. If an arbitrary number assigned to a session is 7, 8, or 9, the session is transmitted through a third tunnel. Alternatively, a tunnel, preferably an available tunnel, may be selected for each session at random. Once a tunnel is selected for a session, packets of the session are transmitted only through the selected tunnel, until the tunnel drops or the performance of the tunnel deteriorates. Processing unit 201 may perform a lookup on the first database to determine how many sessions are assigned to each tunnel, and select tunnels for new sessions accordingly. For example, if a first tunnel is already being used to transmit a large number of sessions, and a second tunnel is not being used to transmit many sessions, processing unit 201 may select the second tunnel for transmitting a new session, so that the first tunnel is not congested.

Depending on the design on processing unit 201 and/or network node, hashing process method and arbitrary number method may consume different computing resources and result in preference in using one or another method. It is also possible the difference in consuming computing resources is small that there is no performance difference in using one or another method.

A hashing process may be applied in order to obtain a hash result, which may be a number that is in the range of 0 to the number of available tunnels minus one. The hash result may be used to select a tunnel for a session. For example, the number of available tunnels from the plurality of tunnels of the aggregated connection is 3. The hashing process then maps session information into numbers 1, 2 or 3, i.e. the hash result is either 1, 2 or 3. Those skilled in the art would know that there are various hashing processes that may be applied to the session information in order to obtain such hash result.

In one example, there are five tunnels established between network node 106 and network node 108, namely first, second, third, fourth, and fifth tunnel. The five tunnels may be established using different combinations of network interfaces of network node 106 and network node 108. For illustration purposes, in one variant, the tunnel IDs assigned to the tunnels may also be a number that is in the range of 0 to the number of available tunnels-1, such that the hash result is equal to the tunnel ID of one of the tunnels. The first, second, third fourth, and fifth tunnels may be assigned with tunnel IDs 0, 1, 2, 3, and 4 respectively. Alternatively, in another variant, the tunnel ID assigned to the tunnels may be any character string or number. Tunnel IDs corresponding to each hash result may be recorded in order to determine a tunnel ID based on a hash result. In order to determine which tunnel should be used for transmitting packets of a session, the following formula may be applied:
Hash result=(Session Information) modulo (Number of available tunnels)

The hash result is used to select a tunnel for transmitting the packet by determining tunnel ID. The tunnel ID is determined according to the hash result.

In one example, for illustration purposes, session information is based on source IP address and destination IP address. A packet received at network node 106 has source IP address 123.123.12.1 and destination IP address 456.456.45.4. The session information can be any combination of the source IP address and the destination IP address. For simplicity, session information may be an integer number obtained from the sum of the source IP address and the destination IP address, i.e. session information is 123123121+456456454, which is 579579575. When there are five available tunnels, according to the formula described above for determining a tunnel ID:
Hash result=579579575 modulo 5=0

Therefore, the first tunnel with tunnel ID 0 is selected for transmitting packets belonging to the session with the corresponding session information.

In another example, for illustration purposes, session information is based on destination port number, source IP address and destination IP address. A packet received at network node 106 has source IP address 123.123.12.1, destination IP address 456.456.45.4 and destination port number 21. For simplicity, session information may be an integer number obtained from the sum of a combination of the destination port number and the source IP address and a combination of the destination port number and the destination IP address. The combination of the destination port number and the source IP address may be obtained by concatenation, i.e. 12312312121. The combination of the destination port number and the destination IP address may also be obtained by concatenation, i.e. 45645645421. The session information, which is the sum of the two combinations, is 12312312121+45645645421, which is 57957957542. When there are five available tunnels, according to the formula described above for determining a tunnel ID:
Hash result=57957957542 modulo 5=2

Therefore, the third tunnel with tunnel ID 2 is selected for transmitting packets belonging to the session with the corresponding session information.

In another example, for illustration purposes, session information is based on source IP address and destination IP address. A packet received at network node 106 has source IP address 123.123.12.1 and destination IP address 456.456.45.4. The session information can be any combination of the source IP address and the destination IP address. For simplicity, session information may be an integer number obtained from the sum of the source IP address and the destination IP address, i.e. session information is 123123121+456456454, which is 579579575. The number of available tunnels is 3, namely, a first tunnel, a second tunnel, and a third tunnel. When there are three available tunnels, according to the formula described above for determining a tunnel ID:
Hash result=579579575 modulo 3=2

For example, a tunnel ID is determined based on the hash result, and the tunnel ID corresponding to hash result 2 is the tunnel ID of the second tunnel. The tunnel ID may be a character string. Therefore, the second tunnel is selected for transmitting packets belonging to the session with the corresponding session information. For illustration purposes, processing unit 201 may record in secondary storage 204 that tunnel ID corresponding to hash result of 1 is 001A, which is the tunnel ID of the first tunnel. Therefore, if hash result is determined to be 1 for a session, the first tunnel is selected for transmitting the session. It may further be recorded that tunnel ID corresponding to hash result of 2 is 0B23, which is the tunnel ID of the second tunnel. Therefore, if hash result is determined to be 2 for a session, the second tunnel is selected for transmitting the session.

In one variant, when the session information is based on source IP address and destination IP address, the session information may an integer number obtained by concatenating the source IP address and the destination IP address. For example, when source IP address is 123.123.12.1 and destination IP address is 456.456.45.4, the session information may be 123123121456456454.

According to one of the embodiments of the present invention, weights may be assigned to each of the plurality of tunnels of an aggregated connection. The weights may be assigned by a user or administrator of network node 106 and/or network node 108. Alternatively, the weights may be assigned by processing unit 201 according to a policy. The policy may be based on one or more of the following criteria: performance of the tunnels, service provider, usage limit, location, time, usage price, security, user identity, Internet Protocol address range, communication protocol, communication technology, application, and device. When the policy is based on performance of the tunnels, the selection may be performed according to performance metrics such as throughput, error rates, packet latency, packet jitter, symbol jitter, quality of service, bandwidth, bit error rate, packet error rate, frame error rate, dropped packet rate, queuing delay, round trip time, capacity, signal level, interference level, bandwidth delay product, handoff delay time, signal-to-interface ratio, and signal-to-noise ratio.

The weights are assigned such that the higher the weight assigned to a tunnel, the higher number of sessions the tunnel may be selected for. For example, a first tunnel is assigned with the highest weight, a second tunnel is assigned with the second highest weight, and a third tunnel is assigned with the lowest weight. For illustration purpose, the weights assigned to the first, second and third tunnels are 50%, 30% and 20% respectively. Therefore, the first tunnel may be selected for approximately 50% of the sessions, the second tunnel may be selected for approximately 30% of the sessions, and the third tunnel may be selected for approximately 20% of the sessions.

According to one of the embodiments of the present invention, weights are assigned to each of the plurality of tunnels by configuring the number of hash results that correspond to each tunnel. For example, an arbitrary number is used for obtaining hash results for sessions. The following formula may be applied in order to obtain the hash result:
Hash result=(Session Information) modulo (Arbitrary number)

The hash result would range from 0 to arbitrary number-1. For illustration purpose, there are three available tunnels, namely first, second and third tunnel. The arbitrary number used for obtaining the hash result is 10. The hash result is then a number in the range of 0 to 9. Processing unit 201 is configured such that, if hash result for a session is in the range of 0 to 3, the session should be transmitted through the first tunnel; if hash result for a session is in the range of 4 to 8, the session should be transmitted through the second tunnel; if hash result for a session is 9, the session should be transmitted through the third tunnel. In this way, the weights assigned to the first, second and third tunnel are in the ratio 4:5:1 respectively. Four hash results correspond to the first tunnel, five hash results correspond to the second tunnel, and one hash result correspond to the third tunnel.

According to one of the embodiments of the present invention, when a tunnel is selected for transmitting packets belonging to a particular session from network node 106 to network node 108, it is preferred to use the same tunnel for receiving packets belonging to the particular session from network node 108. In one variant, in order to ensure that packets belonging to the particular session are transmitted and received through the same tunnel, a second database may be stored in a storage medium of network node 108 or in a remote server accessible by network node 108. The second database contains information regarding which tunnel is selected for which session information at network node 108. For example, a video conferencing session is to be established between laptop 112 and host 121. When a first packet belonging to the video conferencing session, i.e. a packet that arrives the earliest, is received by network node 106 from laptop 112, network node 106 may perform the process of FIG. 4 to select a tunnel for the video conferencing session. For the first packet, network node 106 may need to apply the hashing process to session information of the video conferencing session in step 404. A tunnel, namely the first tunnel, is then selected according to hash result and the first packet is transmitted through the first tunnel. The first tunnel is therefore selected for the video conferencing session. The first database may contain session information of the video conferencing session and tunnel ID of the first tunnel selected for the video conferencing session. For network node 106, the session information may comprise information of the source IP address (IP address of laptop 112), destination IP address (IP address of host 121), and destination port number.

On the other hand, when network node 108 receives a packet belonging to the video conferencing session from host 121, it uses the second database to determine which tunnel should be used for transmitting packets of the video conferencing session to laptop 112 through network node 106. The entries in the second database may be a reversed form of the entries in the first database, which is explained in greater detail below. Network node 106 may inform network node 108 that the first tunnel is selected for the video conferencing session. Session information of the video conferencing session, as recorded in the first database, may also be sent to network node 108. Network node 108 then records in the second database the information that the first tunnel is selected for the video conferencing session. The second database may contain session information of the video conferencing session for packets transmitted from host 121 to laptop 112. The session information in the second database may comprise information of the source IP address (IP address of host 121), destination IP address (IP address of laptop 112), and port number of host 121 used for the video conferencing session. Therefore, when packets belonging to the video conferencing session arrive at network node 108 from host 121, network node 108 performs a lookup on the second database. According to the session information recorded in the second database, network node 108 then transmits the packets belonging to the video conferencing session through the first tunnel to network node 106.

For a session whose session information is already comprised in the first database, the reason why a hashing process is not performed at network node 108 is so that packets belonging to the particular session are transmitted and received through the same tunnel. If a hashing process is applied to the same session information at network node 108, it is possible that the hash result generated at network node 108 is not the same as the hash result generated at network node 106. Therefore, consequently, a tunnel selected at network node 108 for transmitting the session to network node 106 may not be the same as a tunnel selected at network node 106 for transmitting the session to network node 108. Packets belonging to the session are then transmitted and received at network node 106 through different tunnels. In order to avoid this, the second database is used by network node 108 to determine which tunnel should be used for transmitting packets of the session to network node 106.

According to one of the embodiments of the present invention, a tunnel used for transmitting packets of a session from network node 106 to network node 108 may or may not be the same as a tunnel used for transmitting packets of the same session from network node 108 to network node 106. Network node 106 may transmit packets of a session and receive packets of the same session through two different tunnels respectively. For example, in an FTP session, most data may be transmitted from a server to a client rather than client to server. The performance requirement for transmitting data from a server to a client is most likely to be different, i.e. better, than the performance requirement for transmitting data from a client to a server. For illustration purpose, an FTP session is to be established between host 111 and server 122, where host 111 is a client. When a first packet belonging to the FTP session, i.e. a packet that arrives the earliest, is received by network node 106 from host 111, network node 106 may perform the process of FIG. 4 and select a tunnel, namely a first tunnel, for transmitting packets of the FTP session to network node 108. The first database may contain session information of the FTP session and information that the first tunnel is selected for the FTP session. The session information may comprise information of the source IP address (IP address of host 111), destination IP address (IP address of server 122), and destination port number (preferably port 21 of server 122).

hen network node 108 receives a packet belonging to the FTP session from server 122, and the packet is the earliest packet that arrived at network node 108 from server 122, network node 108 may perform the process of FIG. 4 to select a tunnel, namely a second tunnel, for transmitting the packet, and other packets of the FTP session to host 111 through network node 106. The first tunnel may or may not be the same as the second tunnel. Session information of the FTP session and information of that the second tunnel is selected for the FTP session may be recorded in the second database. The first database may contain session information of the FTP session and information that the first tunnel is selected for the FTP session. The session information may comprise information of the source IP address (IP address of server 122), destination IP address (IP address of host 111), and destination port number.

In one variant, for illustration purpose, when network node 106 performs the process of FIG. 4 for the FTP session, a first, a second, and a third tunnel are considered as available tunnels, as the bandwidth limit and performances of the first, second and third tunnel are satisfactory for transmitting packets from host 111 to server 122. After performing the hashing process, any one of the first, second and third tunnels may be selected for transmitting packets belonging to the FTP session. For illustration purpose, network node 108 determines that the performance of the third tunnel is not satisfactory for transmitting packets belonging to the FTP session from server 122 to host 111. Therefore, when network node 108 performs the process illustrated in FIG. 4 for the FTP session, only the first and second tunnels are considered as available tunnels, as the performances of the first and second tunnels are satisfactory for transmitting packets from server 122 to host 111. After performing the hashing process, any one of the first and second tunnels may be selected for transmitting packets belonging to the FTP session.

FIG. 5 illustrates a process for monitoring tunnels according to one of the embodiments of the present invention. After processing unit 201 determines to transmit packets belonging to a particular session through a tunnel, which may be considered as a first tunnel in step 304, processing unit 201 monitors the state of the first tunnel in step 501. A trigger may be received by processing unit 201 when the first tunnel is dropped, broken or terminated. A trigger may also be received when the performance of the first tunnel deteriorates and becomes lower than a predefined threshold. If the trigger has not been received in step 502, the process ends in step 506. If the trigger is received in step 502, processing unit 201 determines to select a new tunnel for transmitting packets belonging to the particular session. In order to select a new tunnel, processing unit 201 again applies a hashing process to the session information of the particular session in step 503. Processing unit 201 may then select and determine the new tunnel in step 504 according to a hash result generated after applying the hashing process. The new tunnel may now be considered as the first tunnel. The session information and tunnel ID of the new tunnel is then stored in a first database in step 505, and the process ends in step 506. Steps 503, 504 and 505 may be similar to steps 404, 405, and 406 of FIG. 4 respectively. Processing unit 201 performs the process of FIG. 5 continually for a plurality of tunnels established between network node 106 and network node 108.

The trigger in step 502 may be generated and sent by a module of processing unit 201 that monitors the status of tunnels established between network node 106 and network node 108. The trigger may then be received by another module of processing unit 201 that performs the process illustrated in FIG. 5.

According to one of the embodiments, when the first tunnel is selected for multiple sessions, namely a first, a second and a third session, and a trigger is received, other tunnel(s) may be selected for few or all of the sessions. For example, if the trigger is received and processing unit 201 determines that the first tunnel is dropped, broken or terminated, then other tunnel(s) are selected for all of the multiple sessions, i.e. to continue transmitting packets belonging to the first, second and third sessions. For illustration purposes, a second tunnel may be selected for the first session and the second session, and a third tunnel may be selected for the third session. Alternatively, the second tunnel may be selected for the first, second, and third session. In another example, if the trigger is received and processing unit 201 determines that the first tunnel is not dropped, broken, or terminated, but the performance of the first tunnel has deteriorated, then other tunnel(s) may be selected for few or all of the sessions. For example, the multiple sessions that the first tunnel was initially selected for include a video conferencing session, an instant messaging session, and a FTP session. Network node 106 may determine to select another tunnel for the video conferencing session and the instant messaging session, but continue using the first tunnel for the FTP session. Network node 106 may be configured by a user or administrator to give lower priority to FTP sessions, such that tunnels with poor performance may be used for FTP sessions. Therefore, packets belonging to the FTP session may continue to be transmitted through the first tunnel, even though the performance of the first tunnel has deteriorated. It should be appreciated that different sessions may have different performance requirements, and therefore, all sessions of a particular tunnel may not need to be transmitted through other tunnels.

In one variant, processing unit 201 keeps the first tunnel established even when the performance of the first tunnel deteriorates. The first tunnel may be used for transmitting management packets, health-check packets, error-correction packets, or the like when its performance has deteriorated. Processing unit 201 may further monitor the performance of the first tunnel. In one example, if processing unit 201 determines that the performance of the first tunnel has improved and has been better than the predefined threshold for a predefined time period, then the first tunnel may again be selected for the session(s) that it was initially selected for.

In one variant, if processing unit 201 determines that the performance of the first tunnel has improved and has been better than the predefined threshold for a predefined time period, then the first tunnel may be considered as an available tunnel for being selected for new sessions.

The trigger and the predefined threshold may be configured by a user or administrator of network node 106. The user or administrator may configure when the trigger should be sent by the module of processing unit 201 that monitors the status of tunnels, i.e. events, such as the tunnel dropping or the performance deteriorating, at which the trigger should be sent.

The benefit of using an aggregated connection instead of load-balancing, may be that, since the plurality of tunnels are aggregated in an aggregated connection, it may be comparatively easier and faster to switching to another tunnel for transmitting packets of a session while the session is still established. This is because the aggregated connection is perceived as a single connection, and the packets are assigned with global sequence numbers when they are transmitted through an aggregated connection. Thus the packets can be reordered at network node 108.

FIG. 6 is a simple illustration of the contents of a database, such as the first database. Table 600 comprises session information column 601 and tunnel ID column 602. Tunnel ID column 602 comprises tunnel IDs corresponding to the session information comprised in session information column 601. For example, a first tunnel with tunnel ID 1 is selected for transmitting a first session with session information 123123121 and a third session with session information 45645645421. A second tunnel with tunnel ID 2 is selected for transmitting a second session with session information 456456454.

Processing unit 201 continually monitors the status of the first and second tunnels as shown in step 501 of FIG. 5. For example, when the first tunnel is dropped, a trigger is received for the first tunnel in step 502. Processing unit 201 then applies a hashing process to session information of sessions that were corresponding to the first tunnel, i.e. the first session and the third session. Therefore, a hashing process is applied to session information 123123121 and 45645645421. Table 610 comprises session information column 601 and tunnel ID column 603. Tunnel ID column 603 comprises tunnel IDs corresponding to the session information comprised in session information column 601. As illustrated in Table 610, after receiving the trigger and applying the hashing process, a third tunnel with tunnel ID 3 is selected for transmitting the first session and the third session.

It is not necessary that the first session and the third session are transmitted through the same tunnel. Different tunnels may be selected for sessions that were previously being transmitted through the same tunnel. Table 620 comprises session information column 601 and tunnel ID column 604. Tunnel ID column 604 comprises tunnel IDs corresponding to the session information comprised in session information column 601. As illustrated in Table 620, after receiving the trigger and applying the hashing process, a third tunnel with tunnel ID 3 is selected for transmitting the first session and the second tunnel with tunnel ID 2 is selected for transmitting the third session.

The embodiments were chosen and described in order to best explain the principles of the invention and its practical applications, to thereby enable others skilled in the art to best utilize the invention and various embodiments with various modifications as are suited to the particular use contemplated.

Figure 1A:
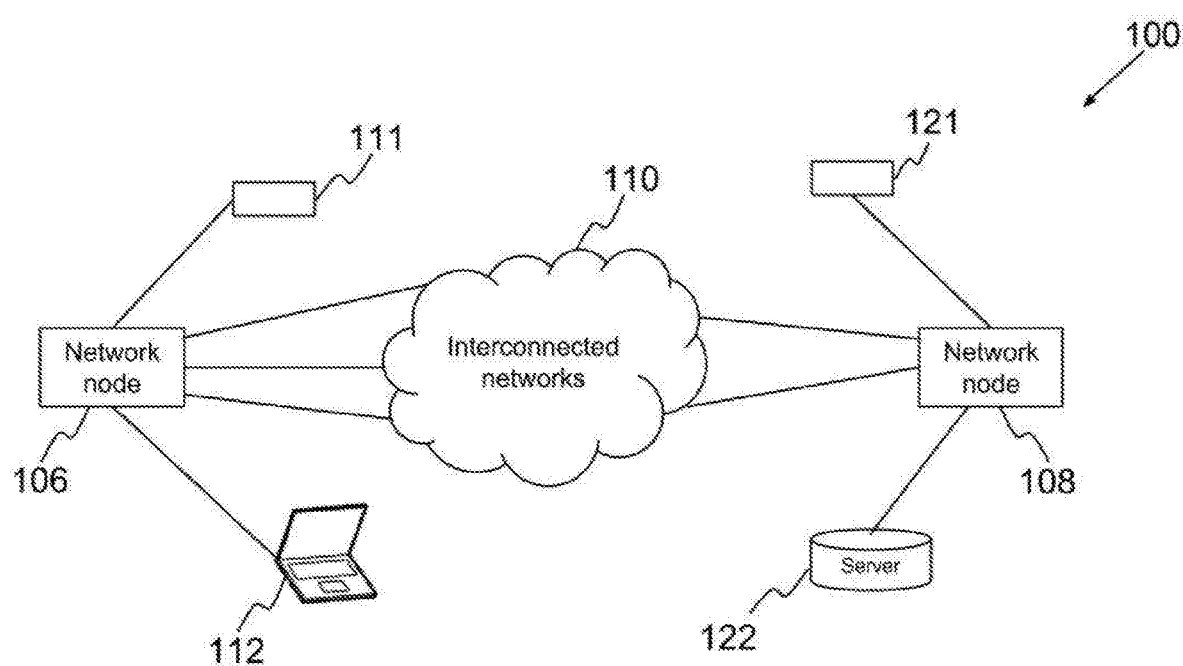
FIG. 1A illustrates a network environment according to various embodiments of the present invention.
Figure 1B:
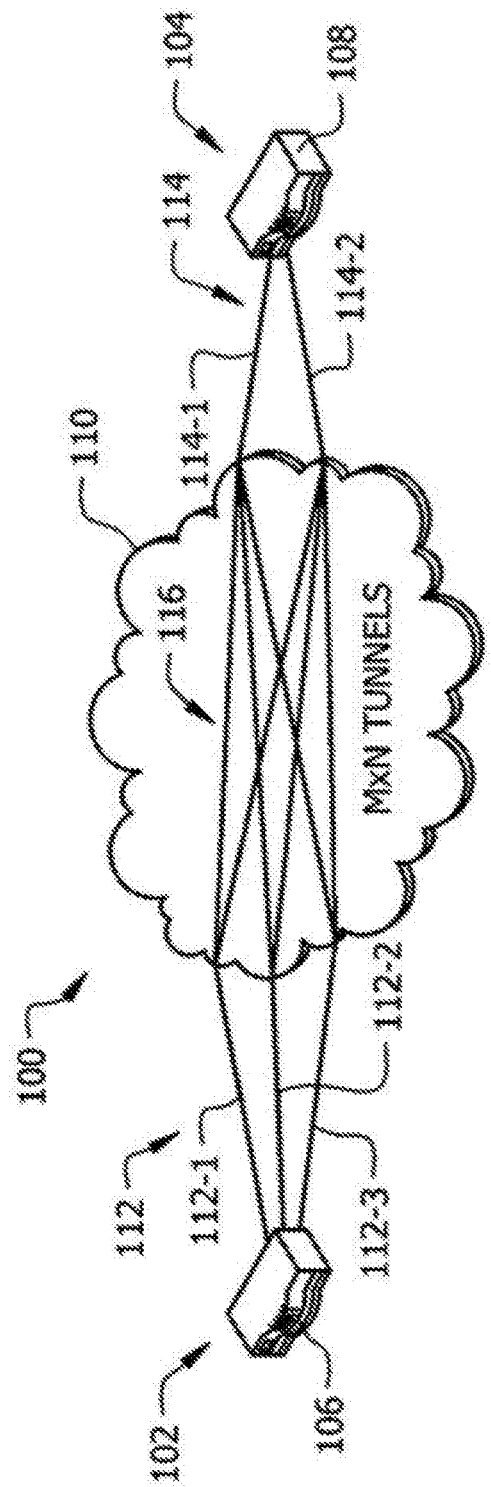
FIG. 1B illustrates system adapted according to embodiments showing tunnels between two network nodes.
Figure 2:
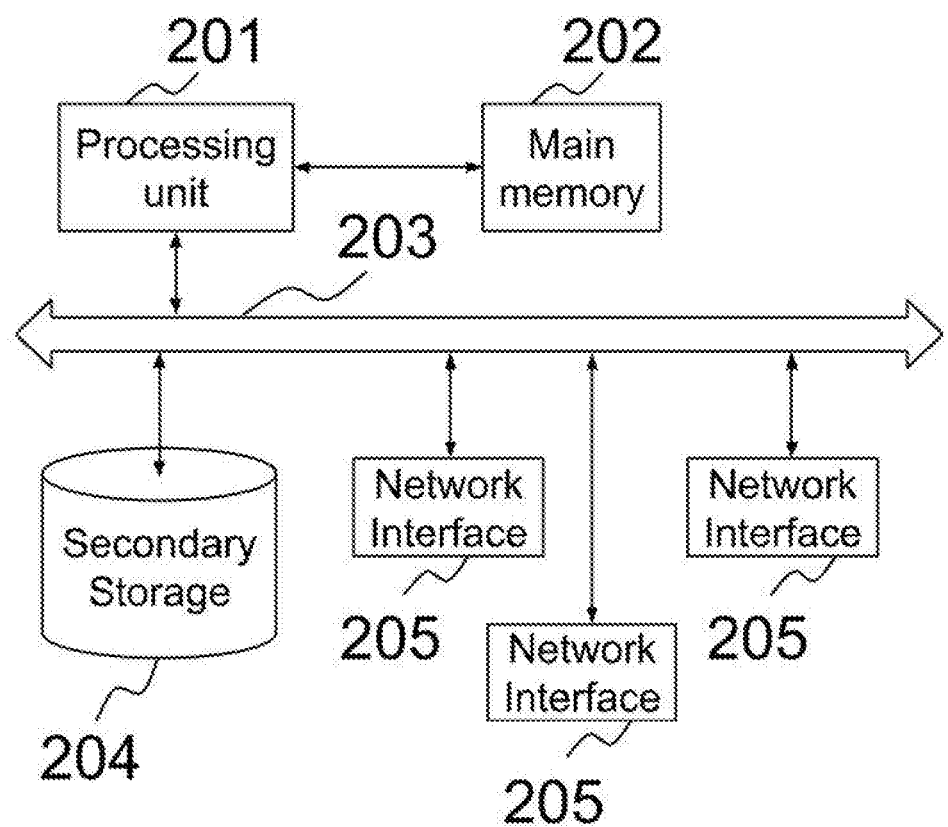
FIG. 2 is an illustrative block diagram of a network node according to one of the embodiments of the present invention.
Figure 3:
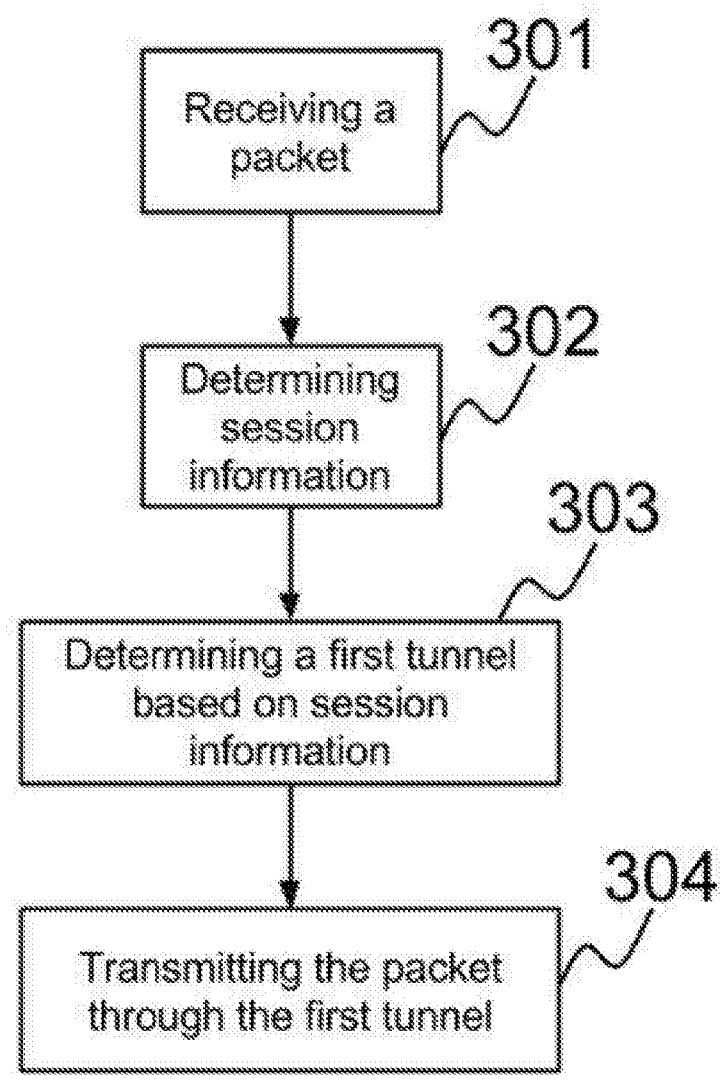
FIG. 3 is a flowchart illustrating a process according to one of the embodiments of the present invention.
Figure 4:
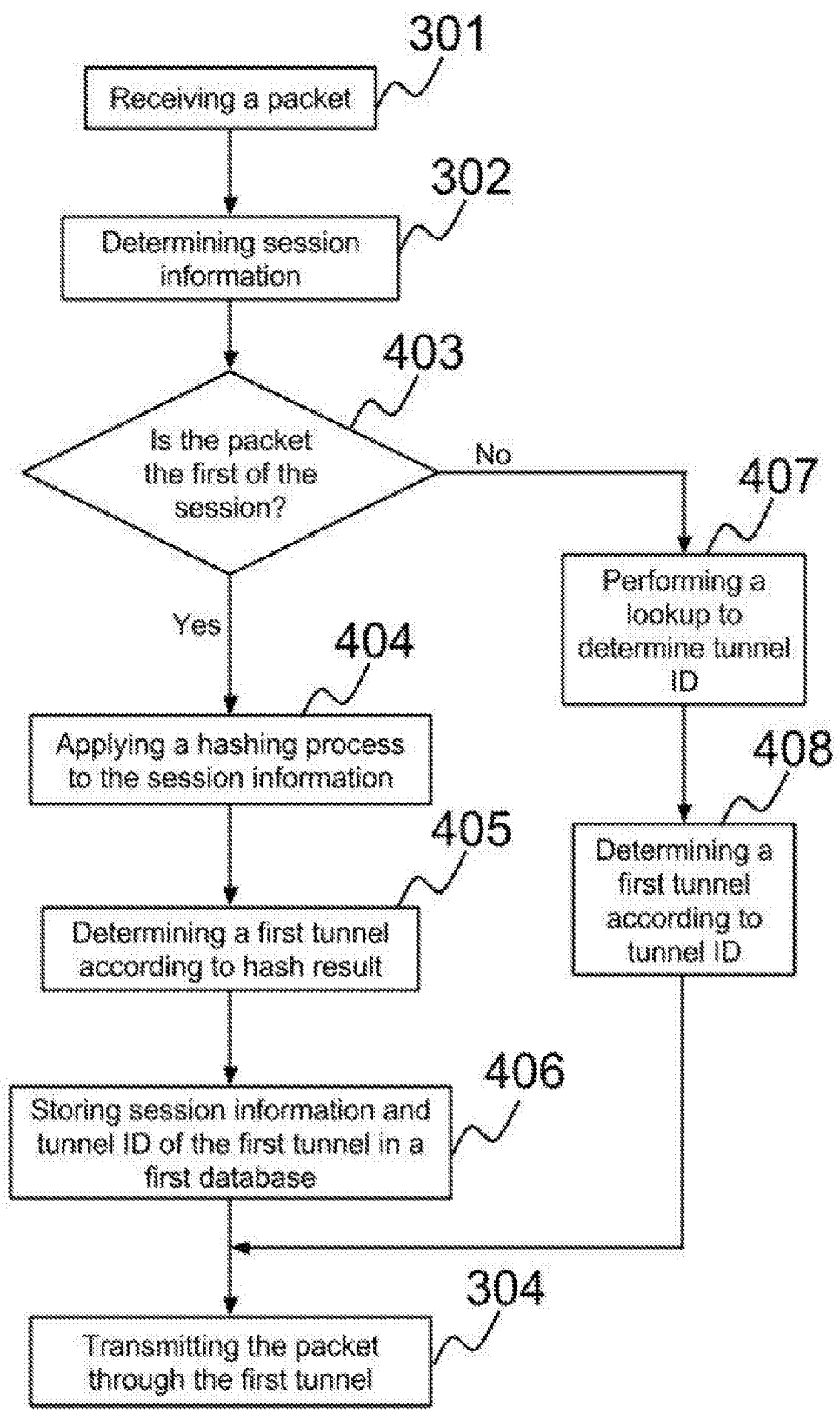
FIG. 4 is a flowchart illustrating a process according to one of the embodiments of the present invention.
Figure 5:
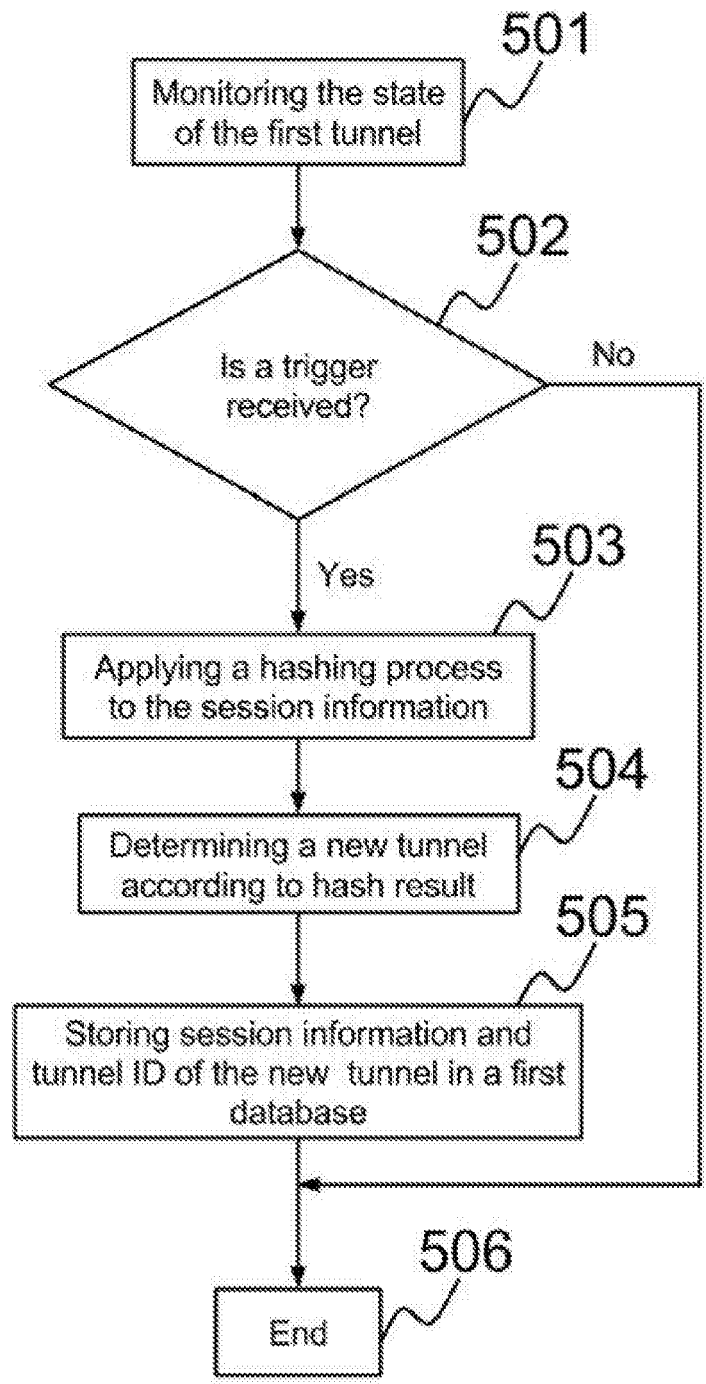
FIG. 5 illustrates a process for monitoring tunnels according to one of the embodiments of the present invention.
Figure 6:
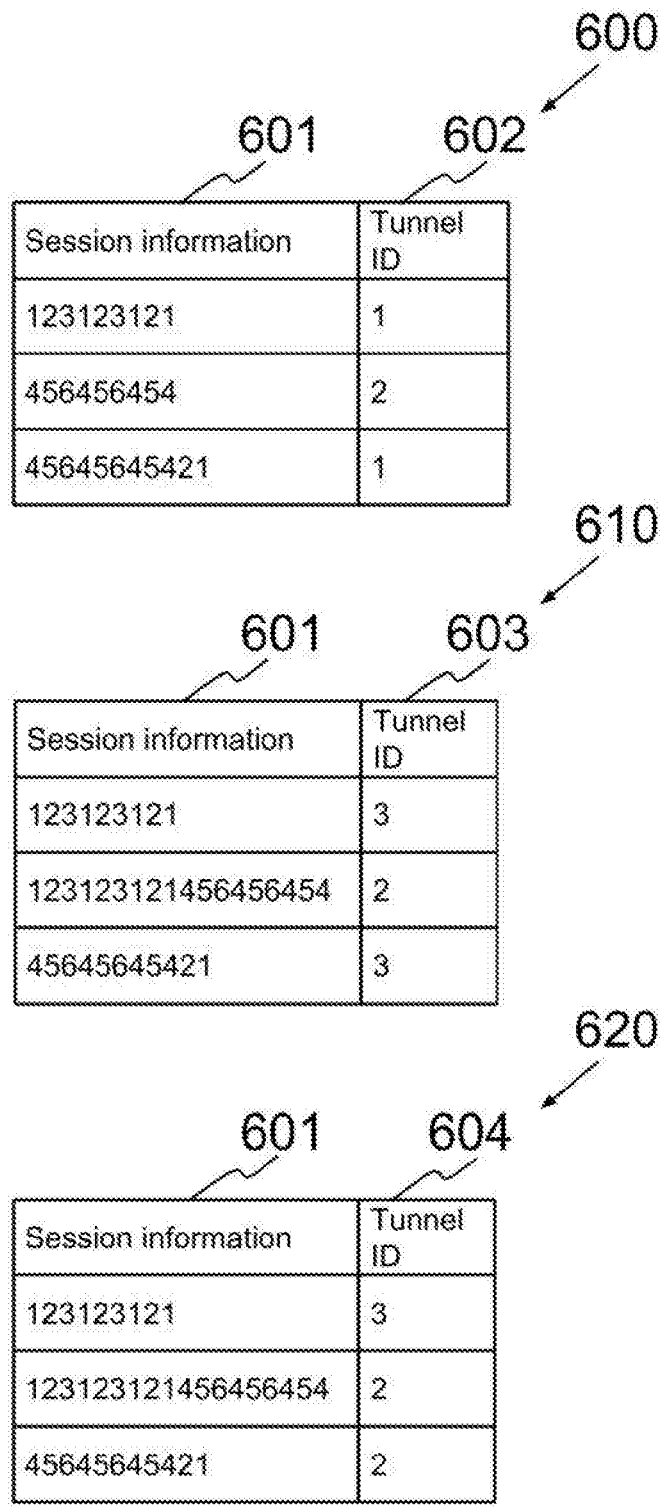
FIG. 6 is a simple illustration of the contents of a database according to one of the embodiments of the present invention.

The invention claimed is:

1. A method for selecting a tunnel for transmitting packets, comprising:
    a. determining session information of a packet;
    b. when the packet is not a first packet in a sequence of any session, performing a search on a database for an identification of a tunnel according to the session information; and selecting a tunnel based on the identification found after performing the search;
    c. when the packet is the first packet in a sequence of a session, selecting a tunnel according to the session information; and storing an identification of the tunnel and the session information in the database; wherein the identification of the tunnel is capable of being found based on the session information; and
    d. transmitting the packet through the selected tunnel.

2. The method of claim 1, wherein the session information is determined according to a source media access control (MAC) address, a destination Internet Protocol (IP) address, a source port number, and a destination port number.

3. The method of claim 1, wherein the session information is determined according to a source IP address, a destination IP address, a source port number, and a destination port number.

4. The method of claim 1, wherein the session information is hashed when being stored in the database.

5. The method of claim 4, wherein when performing the search on the database for the identification of the tunnel according to the session information at step (b), the session information is hashed before being used for the search.

6. The method of claim 1, wherein the selected tunnel is in an aggregated tunnel.

7. The method of claim 6, further comprising: selecting a different tunnel when a trigger is received; wherein the different tunnel is in the aggregated tunnel.

8. The method of claim 7, further comprising: storing an identification of the different tunnel and a hash result in the database.

9. The method of claim 7, wherein the trigger is received when the selected tunnel is dropped, broken, or terminated.

10. The method of claim 1, wherein the packet is transmitted wirelessly.

11. A system for selecting a tunnel for transmitting packets, the system comprising:
    at least one network interface;
    at least one processing unit; and
    at least one non-transitory computer readable storage medium storing program instructions executable by the at least one processing unit and configured to cause the at least one processing unit to perform:
        a. determining session information of a packet;
        b. when the packet is not a first packet in a sequence of any session, performing a search on a database for an identification of a tunnel according to the session information; and selecting a tunnel based on the identification found after performing the search;
        c. when the packet is the first packet in a sequence of a session, selecting a tunnel according to the session information; and storing an identification of the tunnel and the session information in the database;

wherein the identification of the tunnel is capable of being found based on the session information; and d. transmitting the packet through the selected tunnel.

12. The system of claim 11, wherein the session information is determined according to a source media access control (MAC) address, a destination Internet Protocol (IP) address, a source port number, and a destination port number.

13. The system of claim 11, wherein the session information is determined according to a source IP address, a destination IP address, a source port number, and a destination port number.

14. The system of claim 11, wherein the session information is hashed when being stored in the database.

15. The system of claim 14, wherein when performing the search on the database for the identification of the tunnel according to the session information at step (b), the session information is hashed before being used for the search.

16. The system of claim 11, wherein the selected tunnel is in an aggregated tunnel.

17. The system of claim 16, wherein the at least one non-transitory computer readable storage medium storing program instructions executable by the at least one processing unit further stores instructions configured to cause the at least one processing unit to perform: selecting a different tunnel when a trigger is received; wherein the different tunnel is in the aggregated tunnel.

18. The system of claim 17, wherein the at least one non-transitory computer readable storage medium storing program instructions executable by the at least one processing unit further stores instructions configured to cause the at least one processing unit to perform: storing an identification of the different tunnel and a hash result in the database.

19. The system of claim 17, wherein the trigger is received when the selected tunnel is dropped, broken, or terminated.

20. The system of claim 11, wherein the packet is transmitted wirelessly.

* * * * *